3 Sheets—Sheet 1.

D. N. MELVIN.

FURNACES FOR GENERATING STEAM.

No. 7,259. Reissued Aug. 8, 1876.

Attest:
John R. Pearson
Arnold. F. Harkes.

Inventor.
David N. Melvin

N. PETERS, PHOTO-LITHOGRAPHER, WASHINGTON, D. C.

D. N. MELVIN.
FURNACES FOR GENERATING STEAM.
No. 7,259. Reissued Aug. 8, 1876.
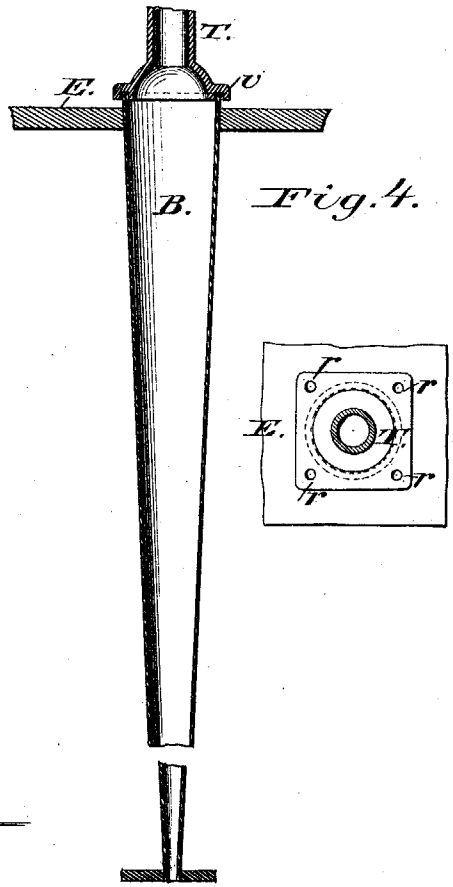
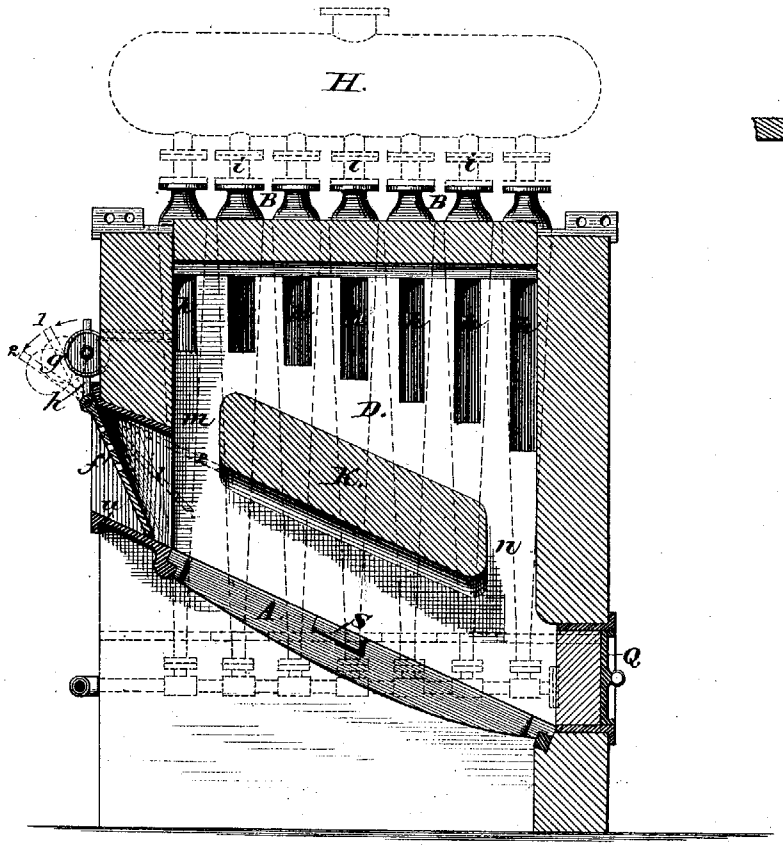
Attest:
John B. Pearson
Arnold F. Parker.
Inventor.
David N. Melvin
N. PETERS, PHOTO-LITHOGRAPHER, WASHINGTON, D. C.

3 Sheets—Sheet 3.

D. N. MELVIN.

FURNACES FOR GENERATING STEAM.

No. 7,259. Reissued Aug. 8, 1876.

*Attest:*
John B. Pearson
Arnold F. Yarker

*Inventor.*
David N. Melvin

N. PETERS, PHOTO-LITHOGRAPHER, WASHINGTON, D. C.

UNITED STATES PATENT OFFICE.

DAVID N. MELVIN, OF LINOLEUMVILLE, NEW YORK, ASSIGNOR, BY MESNE ASSIGNMENTS, TO H. LANSING PERRINE AND ANDREW C. BRADLEY.

IMPROVEMENT IN FURNACES FOR GENERATING STEAM.

Specification forming part of Letters Patent No. 75,039, dated March 3, 1868; reissue No. 7,259, dated August 8, 1876; application filed July 24, 1876.

DIVISION B.

*To all whom it may concern:*

Be it known that I, DAVID NEILSON MELVIN, of Linoleumville, Richmond county, State of New York, formerly of Birmingham, England, have invented certain new and useful Improvements in Steam-Generators, of which the following is a full and exact description, reference being had to the accompanying drawings, in which—

Figure 1:
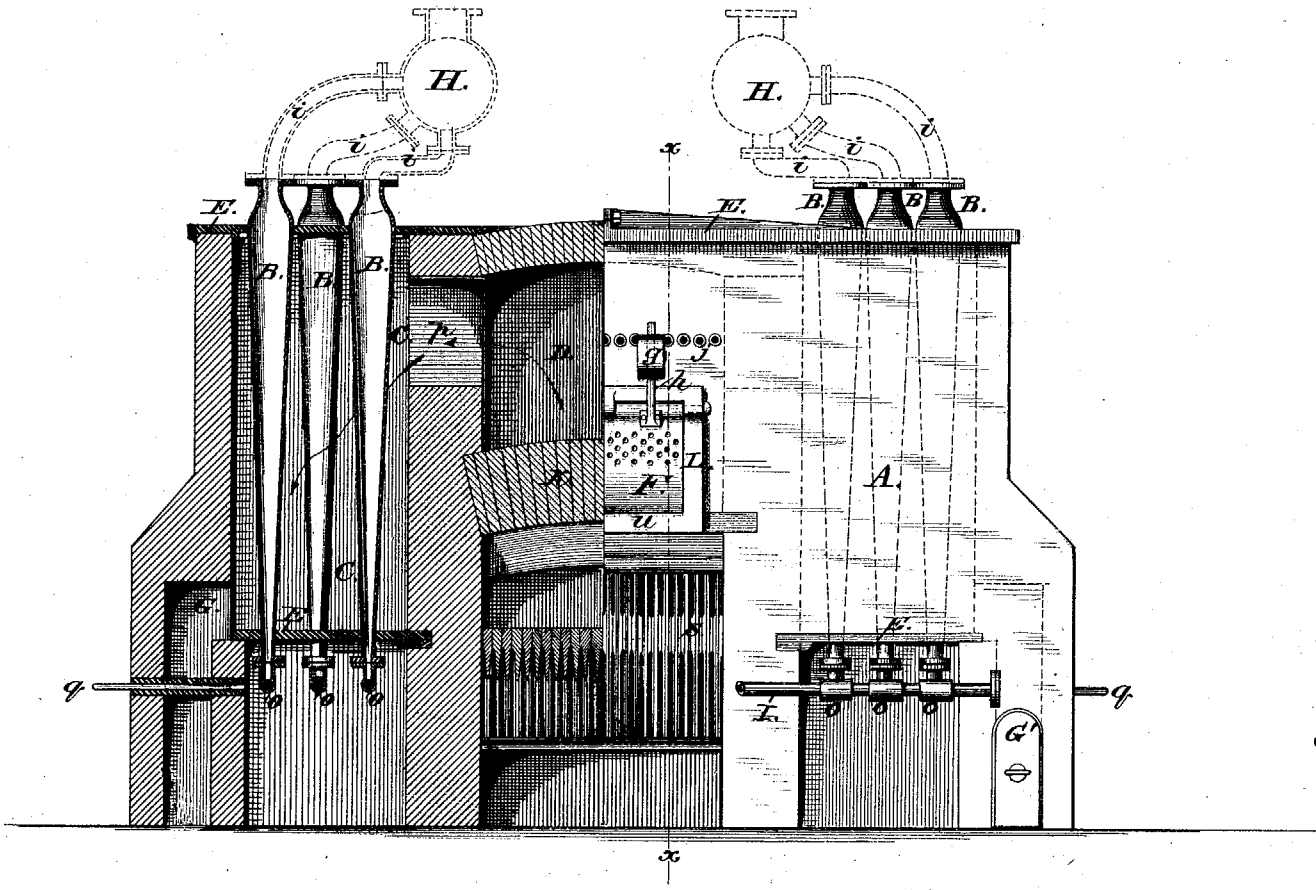
Figure 3:
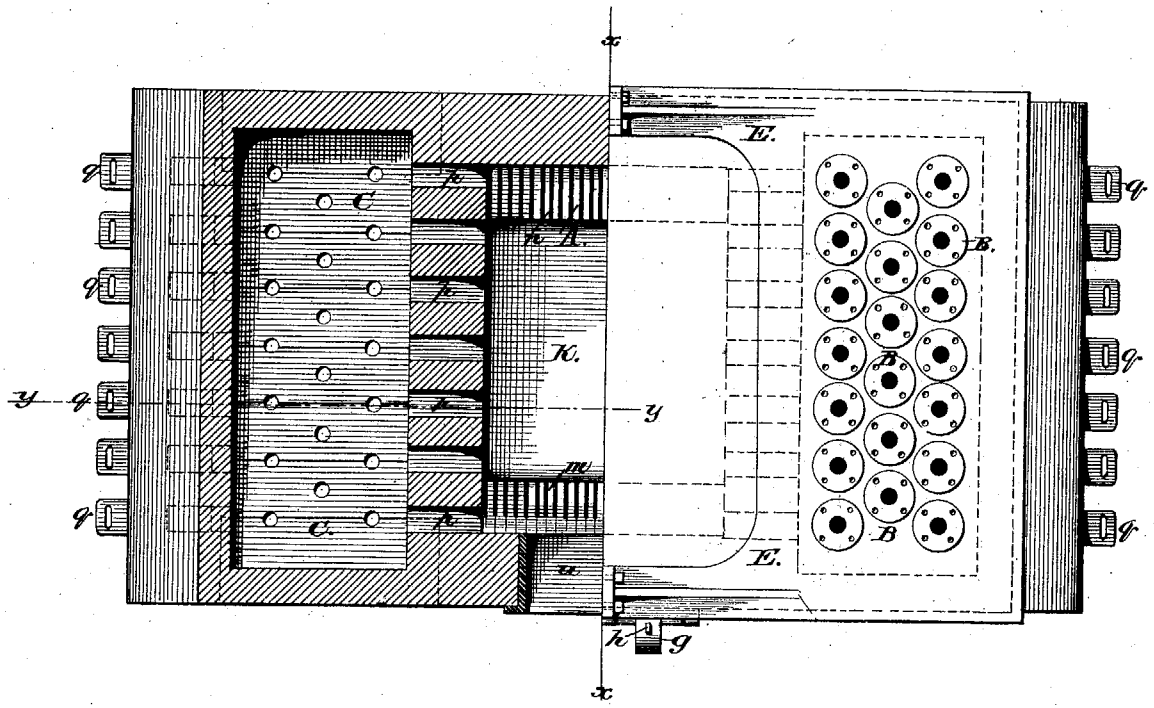

Figure 1 is a front elevation of my improved generator, partly in section. Fig. 2 is a vertical transverse section in the plane of line *x x*, of Fig. 1. Fig. 3 is a top or plan view, partly in horizontal section, and Fig. 4 is a section and plan of one of the boiler-tubes, showing the manner of constructing the same when made of wrought-iron.

The same letter of reference is used in the various figures to indicate the same part.

This invention relates to a novel construction of boilers or water-tubes for steam-generators, whereby they are rendered easily portable and less liable to explosion.

It consists in a boiler composed of one or more inverted conical water tubes or vessels, arranged vertically, each tube distinct and independent of the others and a complete boiler of itself; and also in the arrangement and combination of said tubes, all as hereinafter more fully set forth.

This invention is illustrated in connection with my improved furnace and attachments, which are fully described in an amended specification filed with an application for reissue in connection with this application, and constituting one division of my invention.

The heating-chambers C C, arranged on either side of the furnace, communicate with the combustion-chamber D through the graduated flues *p p p*. In these chambers are arranged the inverted conical tubes B, of the proportions desired, but preferably tapered, as shown in the drawings. They may vary in size, those represented in the drawings being of the intended capacity of two for each horse-power. The object of the use of a number of these tubes is that thereby the danger of explosion may be diminished. The reduction in size of the tubes, and their separation, each from the others, render that less and less as the size is diminished. The tubes are sustained in position by the metallic plates E E, forming the top and bottom of the chamber C, which are provided with taper holes, corresponding to the taper of the tubes supported therein, as is indicated in the drawings. The ends of these tubes project beyond the plates, both above and below, and the pipes are permitted to freely expand and contract in their supports. Their upper ends are connected by pipes *i i i* to the steam domes or receivers H H above. (Represented in dotted lines.) Their lower ends may be fed with water by means of branch pipes *o o*, from a common feed-pipe, I.

The products of combustion escape at the bottom of the chamber C through flues G, at each end of the generator, which communicate with the smoke-stack. These flues are provided with a series of dampers, *q q*, for regulating the draft.

The tubes B may be made of cast or wrought iron. When made of the latter they may be formed, as shown in Fig. 4, with a cap, T, cast with an annular groove, *v*, corresponding in size with the end of the tube, in which is fitted a ring of packing, when it is secured to the tube by bolts *r r*, passing through the flange of the cap and the plate E, or the cap may be connected therewith in any other suitable manner. The chambers C C being of uniform size, while the space filled by the tubes at the bottom of the chamber is much less than that filled by them at the top, there is a much larger area or flue-space at the bottom of the chamber, and a much greater portion of the heated products of combustion contained there, and the heat is the better absorbed by the water in the tubes.

The conical shape of the tubes presents the advantage of subjecting a larger number of the particles of water to immediate contact with the heating-surface of the tube than would be possible in a vertical or horizontal cylindrical tube, and it facilitates the rising and escape of the steam, as it is generated, without producing priming.

Such a construction of tube renders it possible to form a boiler of removable parts of comparatively little weight, easily handled, and readily transported. No joints are exposed to the action of the fire, and consequently all leakage resulting from that source is impossible. The arrangement of the draft-passages *p p*, with the tubes and heating-chambers, causes the most intense heat from the furnace to first come in contact with the enlarged surface of the tubes at the point where the steam is being evolved from the surface, the heat of the draft being absorbed by the tubes as it descends, and presenting a lower temperature to the lower ends of the tubes, where the body of water in the tubes is smaller and cooler.

I claim as my invention—

1. A steam-boiler, composed of one or more inverted conical water-tubes, substantially as set forth.

2. The combination of the vertical water-tubes B with their metallic sustaining-plates E E, substantially as and for the purpose specified.

3. The combination of the chamber C with the flues *p p*, the inverted conical water-tubes B, and sustaining-plates E E, substantially as and for the purpose set forth.

4. The flue G, series of dampers *q q*, and heating-chamber C, in combination with the tubes B and flue-apertures *p p*, substantially as specified.

DAVID N. MELVIN.

Witnesses:

JOHN B. PEARSON,
ARNOLD F. YARKER.